US012635061B2

(12) United States Patent
Kim et al.

(10) Patent No.: US 12,635,061 B2
(45) Date of Patent: May 19, 2026

(54) CONTROL DEVICE AND CONTROL METHOD FOR ELECTRON EMISSION DEVICE FOR X-RAY GENERATION

(71) Applicant: LG ELECTRONICS INC., Seoul (KR)

(72) Inventors: Youngsik Kim, Seoul (KR); Taehyung Kim, Seoul (KR); Sungeun Lee, Seoul (KR); Mikiko Ito, Seoul (KR)

(73) Assignee: LG ELECTRONICS INC., Seoul (KR)

(*) Notice: Subject to any disclaimer, the term of this patent is extended or adjusted under 35 U.S.C. 154(b) by 188 days.

(21) Appl. No.: 18/712,658

(22) PCT Filed: Nov. 24, 2021

(86) PCT No.: PCT/KR2021/017348
§ 371 (c)(1),
(2) Date: May 22, 2024

(87) PCT Pub. No.: WO2023/095940
PCT Pub. Date: Jun. 1, 2023

(65) Prior Publication Data
US 2025/0016902 A1 Jan. 9, 2025

(51) Int. Cl.
*H05G 1/08* (2006.01)
*H01J 35/06* (2006.01)
(Continued)

(52) U.S. Cl.
CPC ............. *H05G 1/085* (2013.01); *H01J 35/06* (2013.01); *H01J 35/08* (2013.01); *H05G 1/265* (2013.01);
(Continued)

(58) Field of Classification Search
CPC ...... H01J 35/06; H01J 35/08; H01J 2235/068; H05G 1/085; H05G 1/10; H05G 1/265; H05G 1/32; H05G 1/34
See application file for complete search history.

(56) References Cited

FOREIGN PATENT DOCUMENTS

| | | | | |
|---|---|---|---|---|
| KR | 20070073342 A * | 7/2007 | ............... | G09G 3/22 |
| KR | 1020070073342 | 7/2007 | | |
| WO | WO-2024071462 A1 * | 4/2004 | ............... | H05G 1/34 |

OTHER PUBLICATIONS

English translation of KR20070073342A1 (Year: 2007).*
Korean Intellectual Property Office Application No. 10-2024-7010991, Office Action dated Jun. 19, 2025, 4 pages.

* cited by examiner

*Primary Examiner* — Mark R Gaworecki
(74) *Attorney, Agent, or Firm* — LEE, HONG, DEGERMAN, KANG & WAIMEY

(57) ABSTRACT

The present invention relates to a device of controlling an electron emission device generating X-rays, the device comprising: an electron emission device including at least one of at least one cathode electrode, an anode electrode paired with the cathode electrode, and a gate electrode for controlling a current flowing through the anode electrode; a cathode current detection part for detecting a current flowing through the cathode electrode of the electrode emission device; a reference voltage generation part for generating a reference voltage; and a gate voltage control part which receives the reference voltage and a detection voltage of the cathode current detection part, determines a gate voltage for controlling the electron emission device so that the detection voltage of the cathode current detection part becomes equal to the reference voltage, and applies the determined gate voltage to the gate electrode of the electron emission device.

15 Claims, 7 Drawing Sheets

(51) Int. Cl.
*H01J 35/08* (2006.01)
*H05G 1/26* (2006.01)
*H05G 1/32* (2006.01)
*H05G 1/34* (2006.01)
*H05G 1/10* (2006.01)

(52) U.S. Cl.
CPC ................. *H05G 1/32* (2013.01); *H05G 1/34* (2013.01); *H01J 2235/068* (2013.01); *H05G 1/10* (2013.01)

CONTROL DEVICE AND CONTROL METHOD FOR ELECTRON EMISSION DEVICE FOR X-RAY GENERATION

CROSS-REFERENCE TO RELATED APPLICATION(S)

This application is the National Stage filing under 35 U.S.C. 371 of International Application No. PCT/KR2021/017348 filed on Nov. 24, 2021, the contents of which are all incorporated by reference herein in their entirety.

TECHNICAL FIELD

The present disclosure relates to an electron emission device that generates X-rays, and relates to a control apparatus and a control method capable of maintaining a current of an anode electrode constant.

BACKGROUND ART

In general, an electron emission device that generates X-rays is provided with a cathode electrode and an anode electrode to generate X-rays through a process of inducing and accelerating electrons emitted from the cathode electrode to the anode electrode where a high voltage is formed to collide with the anode electrode.

A current $I_A$ of the anode electrode, which determines an amount of X-rays generated herein, can be determined by a difference between a current $I_{CA}$ of the cathode electrode and a current flowing through the control electrode (gate electrode), that is, a gate current $I_G$. That is, the current $I_A$ of the anode electrode can be adjusted based on the gate current $I_G$, and the generated amount of X-rays can be adjusted according to the current $I_A$ of the anode electrode.

Meanwhile, the gate current can be determined according to a voltage between the gate electrode and the cathode electrode (hereinafter referred to as a gate-cathode voltage $V_{GC}$). In this case, when the gate-cathode voltage is above a voltage required for electron emission according to the electron emission characteristics of the cathode electrode, the electron emission device can be turned on so as to emit electrons from the cathode electrode. On the contrary, when the gate-cathode voltage is below the voltage required for electron emission according to the electron emission characteristics of the cathode electrode, the electron emission device can be turned off so as not to emit electrons from the cathode electrode.

Meanwhile, the electron emission device uses a high gate voltage. Therefore, once the gate voltage is determined, it is common to fix the determined gate voltage. Therefore, a typical control apparatus for an electron emission device is configured to control a voltage of the cathode electrode so as to form a voltage difference required for electron emission.

In this case, as the cathode voltage increases, the gate-cathode voltage can increase. Furthermore, when being above the voltage required for electron emission according to the electron emission characteristics of the cathode electrode, electrons can be emitted (turn-on). In this case, when the electron emission device is turned on, a gate current can be formed according to the anode current and the cathode current. Furthermore, when the anode current is constant, the cathode current and the gate current applied to the cathode electrode to form the gate-cathode voltage have a proportional relationship.

Meanwhile, the voltage required for electron emission, which is a characteristic of the electron emission device, can be different for each electron emission device. For example, in the case of an electron emission device with a low required voltage, electrons can be emitted even when a low gate-cathode voltage is formed, and in the case of an electron emission device with a not-so-low required voltage, electrons can be emitted only when a high gate-cathode voltage is formed.

However, electron emission devices typically constitute an array such that a plurality of electron emission devices are typically used together. Accordingly, a plurality of electron emission devices each having different characteristics (voltages required for electron emission) can be used together.

Therefore, in order to allow electrons to be emitted from all of the plurality of electron emission devices used together, the gate-cathode voltage can be determined based on a voltage required for the electron emission device with the highest voltage required for electron emission. Accordingly, even for an electron emission device having good performance capable of emitting electrons only at a low voltage, a higher voltage than necessary is applied to the cathode voltage, and therefore, there is a problem of causing an overall unnecessary increase in operating voltage. Such an unnecessary high voltage not only reduces the efficiency of the electron emission device but also causes high-voltage stress in the equipment, and thus there is a problem in that a protection design capable of protecting the electron emission device from high-voltage stress is required.

DISCLOSURE OF INVENTION

Technical Problem

The present disclosure aims to solve the foregoing and other problems, and an aspect of the present disclosure is to provide an electron emission device control apparatus capable of adjusting a gate voltage to adjust an anode current, which determines an amount of X-rays generated therefrom, and a method of controlling the same.

In addition, an aspect of the present disclosure is to provide an electron emission device control apparatus capable of adjusting a gate voltage to form a gate-cathode voltage according to the characteristics of an electron emission device so as to prevent an unnecessarily high gate-cathode voltage from being applied thereto, and a method of controlling the same.

Solution to Problem

In order to achieve the foregoing and other objectives, according to an aspect of the present disclosure, an electron emission device control apparatus in accordance with an embodiment of the present disclosure can include an electron emission device including at least one cathode electrode, an anode electrode paired with the cathode electrode, and at least one gate electrode for controlling a current flowing through the anode electrode, a cathode current detector that detects a current flowing through the cathode electrode of the electron emission device, a reference voltage generator that generates a reference voltage, and a gate voltage controller that receives the reference voltage and the detection voltage of the cathode current detector, determines a gate voltage for controlling the electron emission device such that the detection voltage of the cathode current detector is equal to the reference voltage, and applies the determined gate voltage to the gate electrode of the electron emission device.

In one embodiment, the gate voltage controller can determine a voltage greater than the reference voltage by a gate-cathode voltage formed between the gate electrode and the cathode electrode as the gate voltage, wherein the gate-cathode voltage is a voltage threshold required for electron emission from the cathode electrode.

In one embodiment, the current flowing through the anode electrode can be a current corresponding to the reference voltage when the current flowing through the anode electrode and the current flowing through the gate electrode satisfy a preset condition.

In one embodiment, the control apparatus can further include a gate current detector for detecting a gate current flowing through the gate electrode in the electron emission device, wherein the gate voltage controller determines a gate voltage for controlling the electron emission device such that the detection voltage of the cathode current detector is equal to a sum of the reference voltage and a compensation voltage for the gate current, and the compensation voltage is determined according to a detection resistance $Z_{ref}$ of the cathode current detector for the current flowing through the cathode electrode and a magnitude of the gate current.

In one embodiment, a gate voltage that causes the detection voltage of the cathode current detector to be equal to the sum of the reference voltage and the compensation voltage can be determined as a voltage greater than the detection voltage by a voltage that is a sum of the compensation voltage, a gate-cathode voltage formed between the gate electrode and the cathode electrode, and the detection voltage of the gate current detector.

In one embodiment, the current flowing through the anode electrode can be determined according to a magnitude of the reference voltage with respect to the detection resistance $Z_{ref}$ of the cathode current detector.

In one embodiment, the cathode current detector and the gate current detector can each be any one of a hole sensor, a magneto impedance (MI) current sensor, and a current sensor that detects a voltage dropped by a shunt resistance as a current.

In one embodiment, the cathode current detector can further include an amplifier for amplifying a voltage applied to a detection resistance of the cathode current detector, wherein the gate voltage controller determines the gate voltage based on a detection voltage of the cathode current detector, which is detected based on a detection resistance relatively lowered by an amplification gain of the amplifier.

In order to achieve the foregoing and other objectives, according to an aspect of the present disclosure, a control method of an electron emission device control apparatus in accordance with the present disclosure can include detecting a cathode voltage corresponding to a current flowing through the cathode electrode, detecting a reference voltage, determining a gate voltage such that the cathode current detection voltage is equal to the reference voltage based on a gate-cathode voltage, which is a voltage between a gate electrode of the electron emission device and the cathode electrode, and the reference voltage, and applying the determined gate voltage to the electron emission device to control the electron emission device such that a current corresponding to the reference voltage flows through the cathode electrode as the gate-cathode voltage drops through the electron emission.

In one embodiment, the gate-cathode voltage can be a voltage threshold required for electron emission from the cathode electrode.

In one embodiment, a current flowing through an anode electrode of the electron emission device can be a current corresponding to the reference voltage when the current flowing through the anode electrode and a current flowing through the gate electrode satisfy a preset condition.

In one embodiment, the detecting of the reference voltage can further include detecting a gate current flowing through the gate electrode, wherein the determining of the gate voltage includes determining a gate voltage for controlling the electron emission device such that the cathode voltage is equal to a sum of a compensation voltage for the gate current and the reference voltage, and the compensation voltage is determined according to a magnitude of the gate current and a detection resistance $Z_{ref}$ for detecting the cathode voltage from the cathode current.

In one embodiment, a gate voltage that causes the cathode voltage to be equal to the sum of the reference voltage and the compensation voltage can be determined as a voltage greater than the detection voltage by a voltage that is a sum of the compensation voltage, the gate-cathode voltage, and a detection voltage corresponding to the gate current.

In one embodiment, the detecting of the cathode voltage can further include amplifying a voltage applied to a detection resistance $Z_{ref}$ for detecting a current flowing through the cathode electrode as the cathode voltage, wherein the determining of the gate voltage includes determining the gate voltage based on the cathode voltage detected based on the detection resistance relatively lowered by an amplification gain.

In one embodiment, a current flowing through an anode electrode of the electron emission device can be determined according to a magnitude of the reference voltage with respect to the detection resistance $Z_{ref}$ for detecting a current flowing through the cathode electrode as the cathode voltage.

Advantageous Effects of Invention

The effects of an electron emission device control apparatus and a method of controlling the apparatus according to an embodiment of the present disclosure will be described as follows.

According to at least one of the embodiments of the present disclosure, the present disclosure can use a metal-oxide-semiconductor field-effect transistor (MOSFET) device as a gate of the electron emission device, thereby allowing the electron emission device to be turned on at a lower gate voltage. Accordingly, the adjustment of a gate voltage can be facilitated to control an anode current through adjusting the gate voltage, thereby having an effect capable of adjusting the anode current to be constant without the need to control a cathode voltage.

In addition, the present disclosure can allow the anode current to be controlled through adjusting the gate voltage according to a gate-cathode voltage according to the characteristics of the electron emission device. Therefore, there is no need to apply an unnecessarily high cathode voltage, thereby having an effect capable of solving problems caused by the application of an unnecessary high voltage, such as unnecessarily high operating voltage and high voltage stress.

MODE FOR THE INVENTION

It should be noted that technical terms used herein are merely used to describe specific embodiments, and are not intended to limit the present disclosure. Furthermore, a singular expression used herein includes a plural expression unless it is clearly construed in a different way in the context. A suffix "module" or "unit" used for elements disclosed in the following description is merely intended for easy description of the specification, and the suffix itself is not intended to have any special meaning or function.

As used herein, terms such as "comprise" or "include" should not be construed to necessarily include all elements or steps described herein, and should be construed not to include some elements or some steps thereof, or should be construed to further include additional elements or steps.

In addition, in describing technologies disclosed herein, when it is determined that a detailed description of known technologies related thereto can unnecessarily obscure the subject matter disclosed herein, the detailed description will be omitted.

Furthermore, the accompanying drawings are provided only for a better understanding of the embodiments disclosed herein and are not intended to limit technical concepts disclosed herein, and therefore, it should be understood that the accompanying drawings include all modifications, equivalents and substitutes within the concept and technical scope of the present disclosure. In addition, not only individual embodiments described below but also a combination of the embodiments can, of course, fall within the concept and technical scope of the present disclosure, as modifications, equivalents or substitutes included in the concept and technical scope of the present disclosure.

Figure 1:
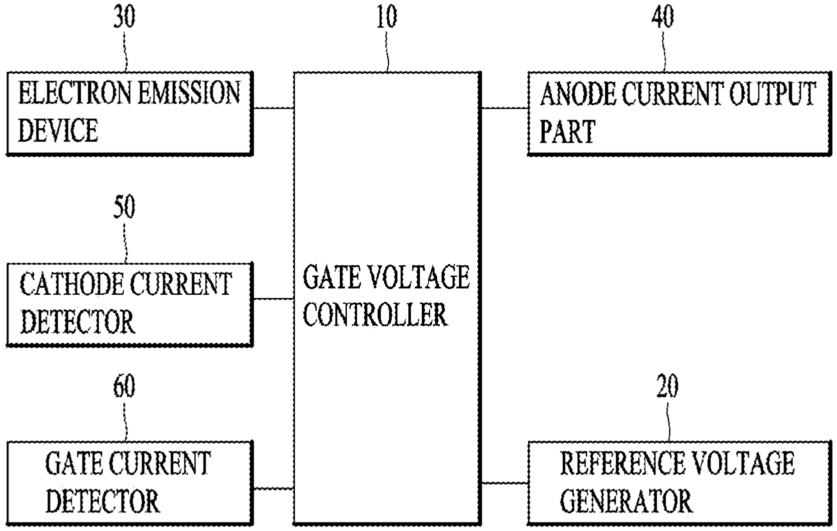
FIG. 1 is a block diagram showing a configuration of an electron emission device control apparatus according to an embodiment of the present disclosure.

FIG. 1 is a block diagram showing a configuration of an electron emission device control apparatus according to an embodiment of the present disclosure.

Referring to FIG. 1, the electron emission device control apparatus according to an embodiment of the present disclosure can include a gate voltage controller 10, an electron emission device 30 connected to the gate voltage controller 10, a cathode current detector 50 for detecting a cathode terminal current (hereinafter referred to as a cathode current) of the electron emission device 30, and a reference voltage generator 20 that generates a reference voltage. Furthermore, a gate current detector 60 that detects a gate current applied to the electron emission device 30 and an anode current output part 40 that outputs a current (hereinafter referred to as anode current) applied to an anode electrode of the electron emission device 30 can be further connected to the gate voltage controller 10.

The elements shown in FIG. 1 are not essential for implementing an electron emission device control apparatus, and thus the electron emission device control apparatus described herein can have more or fewer components than those listed above.

More specifically, among the above elements, the electron emission device 30 can include at least one electron emission device. In case where the electron emission device 30 includes a plurality of electron emission devices, the plurality of electron emission devices can constitute an array.

Therefore, the electron emission device 30 can include at least one cathode electrode that emits electrons, and can include at least one anode electrode paired with the cathode electrode. Furthermore, the electron emission device 30 can include at least one gate electrode for controlling the flow of electrons moving between the cathode electrode and the anode electrode.

Here, a gate voltage determined by the gate voltage controller 10 can be applied to the gate electrode. Furthermore, the cathode electrode can emit electrons when a voltage difference between the cathode electrode and the gate electrode, that is, a gate-cathode voltage, exceeds a preset electron emission threshold. Furthermore, electrons emitted from the cathode electrode can be induced and accelerated by a high voltage applied to an anode electrode to collide with the anode electrode. Furthermore, X-rays can be generated through the collision of the electrons.

Here, since X-rays are generated by the collisions of electrons, an amount of X-rays generated is determined by a magnitude of the current rather than the voltage. That is, the amount of X-rays generated can be determined according to an anode current $I_A$ applied to the anode electrode. Furthermore, the anode current $I_A$ can be determined by a difference between a current $I_{CA}$ of the cathode electrode and a current flowing out through the gate electrode, that is, a gate current $I_G$($I_{CA}$=$I_A$+$I_G$). That is, the current $I_A$ of the anode electrode can be adjusted according to the gate current $I_G$, and the amount of X-rays generated can be adjusted according to the current $I_A$ of the anode electrode.

Furthermore, the cathode current detector 50 can detect a current applied to at least one cathode electrode of the electron emission device 30, that is, a current flowing out through the cathode electrode (hereinafter referred to as a cathode current). To this end, the cathode current detector 50 can include at least one current sensor to detect a current.

The cathode current detector 50 can include various sensors as a current sensor. For example, the cathode current detector 50 can include a hole sensor or a magneto impedance (MI) current sensor using a magnetic field impedance effect. Alternatively, for the current sensor, it can be provided with a current sensor that includes a shunt resistor to detect a voltage drop due to the shunt resistor as a current. In the following description, for the sake of convenience of explanation, an example in which the cathode current detector 50 detects the cathode current as a voltage detected using the shunt resistor will be described.

However, the present disclosure is not, of course, limited thereto, and a magnitude of the cathode current detected through the hole sensor or MI sensor can also, of course, be used. As an example, in the case of the hole sensor or MI sensor, the cathode current can be directly detected without a shunt resistance, and in this case, assuming that there is a resistance (e.g., 1 ohm) having a preset value, a cathode voltage corresponding to the detected cathode current can be determined.

Meanwhile, the gate voltage controller 10 can determine a gate voltage capable of maintaining the anode current of the electron emission device 30 constant and apply the determined gate voltage to the electron emission device 30. To this end, the gate voltage controller 10 can first detect the cathode current of the electron emission device 30 through the cathode current detector 50. Furthermore, a gate voltage that causes a voltage (cathode voltage) corresponding to the cathode current to be a reference voltage $V_{ref}$ generated by the reference voltage generator 20 can be determined.

In this case, a difference between the gate voltage $V_G$ and the cathode voltage $V_{CA}$ forms a voltage required to emit electrons from the cathode electrode, that is, a gate-cathode voltage $V_{GC}$, so the gate voltage $V_G$ that causes the cathode voltage $V_{CA}$ to be the reference voltage $V_{ref}$ can be a voltage greater than the reference voltage $V_{ref}$ by the gate-cathode voltage $V_{GC}$.

That is, the gate voltage controller 10 can determine the gate-cathode voltage $V_{GC}$, determine the gate voltage $V_G$ including the determined gate-cathode voltage $V_{GC}$ and the reference voltage $V_{ref}$, and apply the determined gate voltage $V_G$ to the electron emission device 30, thereby controlling the electron emission device 30 such that the cathode current $I_{CA}$ corresponding to the reference voltage $V_{ref}$ flows through the cathode electrode of the electron emission device 30.

In this case, assuming that the gate current $I_G$ is sufficiently small compared to the anode current $I_A$, the cathode current $I_{CA}$ becomes equal to the anode current $I_A$, and the cathode current $I_{CA}$ has a current value corresponding to the reference voltage $V_{ref}$, so the anode current $I_A$ can be controlled to be constant according to the reference voltage $V_{ref}$.

Hereinafter, the configuration of the electron emission device control apparatus according to an embodiment of the present disclosure, which can be applied in a case where the gate current $I_G$ is sufficiently small compared to the anode current $I_A$, will be described in more detail with reference to FIGS. 2 to 4 below.

Meanwhile, when the gate current $I_G$ is not sufficiently small compared to the anode current $I_A$, the cathode voltage $V_{CA}$ can include a compensation voltage $\Delta V$ for the gate current $I_G$. Therefore, the gate voltage controller 10 can determine the gate-cathode voltage $V_{GC}$, determine the gate voltage $V_G$ including the determined gate-cathode voltage $V_{GC}$, the reference voltage $V_{ref}$, and the compensation voltage $\Delta V$, and apply the determined gate voltage $V_G$ to the electron emission device 30, thereby controlling the electron emission device 30 such that the cathode current $I_{CA}$ corresponding to a voltage including the reference voltage $V_{ref}$ and the compensation voltage $\Delta V$ flows through the cathode electrode of the electron emission device 30.

In this case, the cathode current $I_{CA}$ has a current value determined according to the reference voltage $V_{ref}$ (a current value corresponding to the reference voltage $V_{ref}$+ the compensation voltage $\Delta V$), so the anode current $I_A$ can be controlled to be constant according to the reference voltage $V_{ref}$.

Meanwhile, in order to detect the compensation voltage $\Delta V$ for the gate current $I_G$, the electron emission device control apparatus according to an embodiment of the present disclosure can further include a gate current detector 60 for detecting a current flowing out through the gate electrode in the electron-emitting device 30, that is, the gate current $I_G$.

The gate current detector 60 can include various sensors as a current sensor for detecting the gate current $I_G$. For example, the gate current detector 60 can include a hole sensor or an MI current sensor using a magnetic field impedance effect. Alternatively, for the current sensor, it can be provided with a current sensor that includes a shunt resistor to detect a voltage drop due to the shunt resistor as a current. In the following description, for the sake of convenience of explanation, an example in which the gate current detector 60 detects the gate current as a voltage detected using the shunt resistor will be described.

However, the present disclosure is not, of course, limited thereto, and a magnitude of the gate current detected through the hole sensor or MI sensor can also, of course, be used. As an example, in the case of the hole sensor or MI sensor, the gate current can be directly detected without a shunt resistance, and in this case, assuming that there is a resistance (e.g., 1 ohm) having a preset value, a compensation voltage $\Delta V$ corresponding to the detected gate current can be determined.

Hereinafter, the configuration of the electron emission device control apparatus according to an embodiment of the present disclosure, which can be applied in a case where the gate current $I_G$ is not sufficiently small compared to the anode current $I_A$, will be described in more detail with reference to FIGS. 5 to 8 below.

Meanwhile, these days, with the development of technology, a gate device such as a MOSFET device that can operate at a low operating voltage and flow a large amount of current at a fast-operating speed, such as a MOSFET device has been introduced. Accordingly, the electron emission device 30 of the electron emission device control apparatus according to an embodiment of the present disclosure can be an electron emission device provided with the MOSFET device or a gate device corresponding to the MOSFET device, and configured to be turned on even at a low gate voltage. Therefore, the gate voltage of the electron emission device 30 can be more easily adjusted.

Hereinafter, the foregoing configuration and operation of the electron emission device control apparatus according to an embodiment of the present disclosure will be described in more detail through a plurality of conceptual diagrams and flowcharts.

Figure 2:
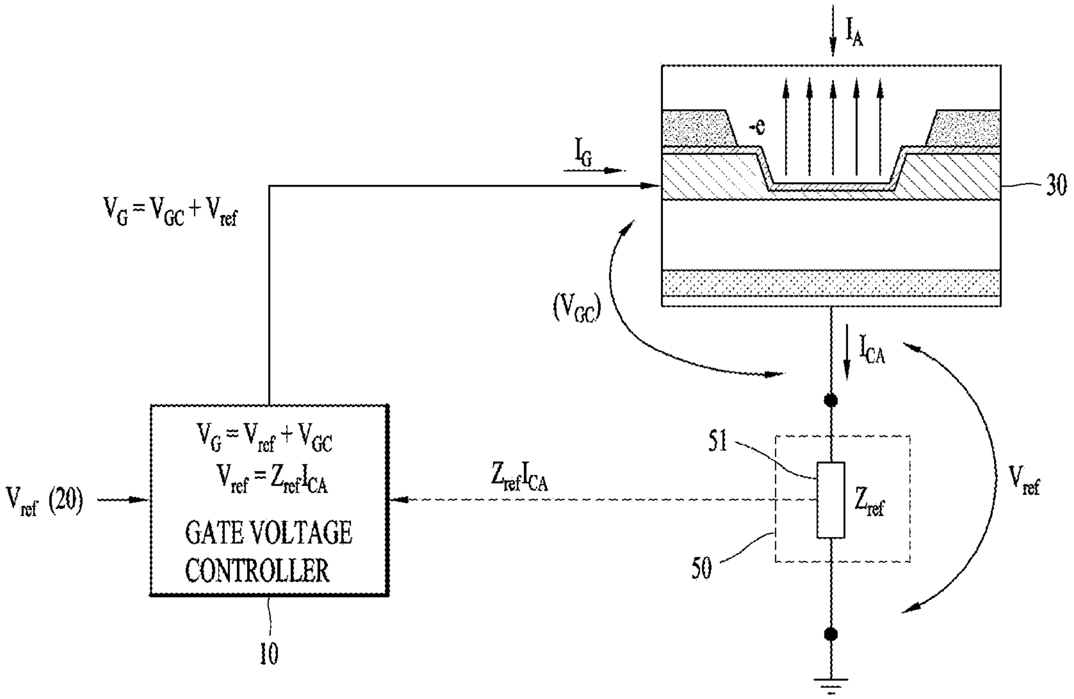
FIG. 2 is a block diagram for explaining a configuration of an electron emission device control apparatus according to an embodiment of the present disclosure.

First, FIG. 2 is a diagram for explaining an electron emission device control apparatus according to an embodiment of the present disclosure, which can be applied in a case where the magnitude of the gate current $I_G$ is sufficiently small compared to the anode current $I_A$. Furthermore, FIG. 3 is a flowchart showing an operation process of controlling a gate voltage to control an anode current in the electron emission device control apparatus as shown in FIG. 2.

Figure 3:
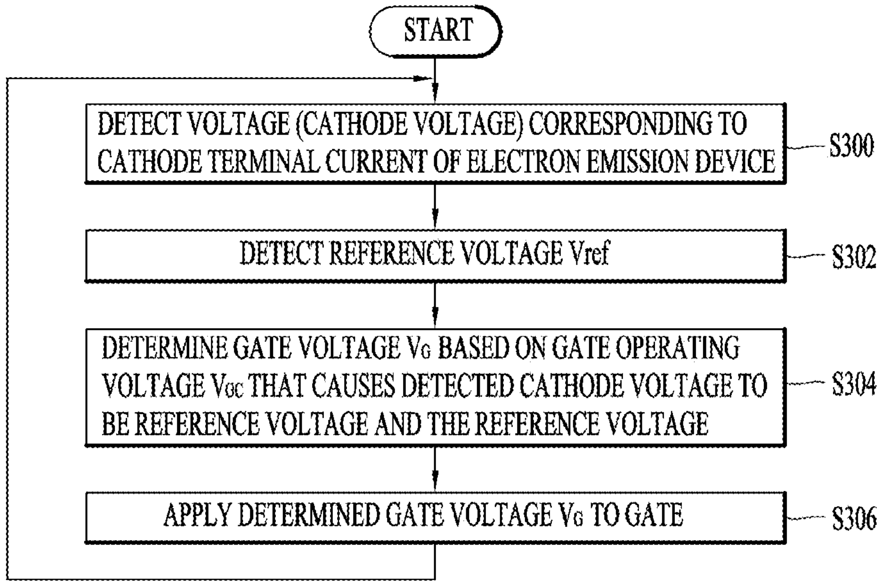
FIG. 3 is a flowchart showing an operation process in which an electron emission device control apparatus according to an embodiment of the present disclosure controls a gate voltage to control an anode current.

Referring to FIGS. 2 and 3, first, the cathode current detector 50 can detect a current flowing through at least one cathode electrode of the electron emission device 30. Here, in a case where the cathode current detector 50 detects a current using a shunt resistance, the cathode current detector 50 can detect a voltage (cathode voltage $V_{CA}$) corresponding to the cathode current $I_{CA}$ with a value obtained by multiplying the detection resistance $Z_{ref}$ of the cathode current detector 50 by the cathode current $I_{CA}$ (S300). Here, since the cathode current detection resistance $Z_{ref}$ has a fixed value, the cathode current detection resistance $Z_{ref}$ can be considered as a proportional constant of the cathode current detector 50 for the cathode current $I_{CA}$.

Meanwhile, when the cathode voltage is detected through the cathode current detector 50, the gate voltage controller 10 can detect the reference voltage $V_{ref}$ generated by the reference voltage generator 20 (S302). Furthermore, the gate voltage $V_G$ that causes the detected cathode voltage $V_{CA}$ to be equal to the reference voltage $V_{ref}$ can be determined (S304). Furthermore, the determined gate voltage $V_G$ can be applied to the gate electrode of the electron emission device 30 (S306).

Here, the cathode voltage $V_{CA}$ corresponds to a difference between the gate voltage $V_G$ and the gate-cathode voltage $V_{GC}$. That is, the sum of the cathode voltage $V_{CA}$ and the gate-cathode voltage $V_{GC}$ becomes the gate voltage $V_G$ ($V_{CA}+V_{GC}=V_G$), so the gate voltage $V_G$ that causes the cathode voltage $V_{CA}$ to be equal to the reference voltage $V_{ref}$ can be a voltage greater than the reference voltage $V_{ref}$ by the gate-cathode voltage $V_{GC}$, as shown in Equation 1 below.

$$V_G = V_{GC} + V_{ref} \quad \text{[Equation 1]}$$

Here, $V_G$ is a gate voltage, $V_{GC}$ is a gate-cathode voltage, and $V_{ref}$ is a reference voltage.

Therefore, when the gate voltage $V_G$ according to Equation 1 is applied to the gate electrode of the electron emission device 30, a voltage required for electron emission from the cathode electrode, that is, a voltage higher than the gate-cathode voltage $V_{GC}$ by the reference voltage $V_{ref}$ is applied to the gate electrode, and electrons can be emitted from the cathode electrode. Furthermore, a voltage remaining after the electrons are emitted can be applied to the cathode electrode. That is, a voltage dropped from the gate voltage $V_G$ by a voltage required for electron emission (gate-cathode voltage $V_{GC}$) can be applied to the cathode electrode, and accordingly, the reference voltage $V_{ref}$ is applied to the cathode electrode. Therefore, the reference voltage $V_{ref}$ can be the cathode voltage $V_{CA}$ as shown in Equation 2 below.

$$V_{ref} = Z_{ref} \cdot I_{CA} = V_{CA} \quad \therefore I_{CA} = \frac{Z_{ref}}{V_{ref}} \quad \text{[Equation 2]}$$

Here, $V_{ref}$ is a reference voltage, $I_{CA}$ is a cathode current, and $Z_{ref}$ is a proportional constant of the cathode current detector for the cathode current.

Meanwhile, since the cathode current $I_{CA}$ has a relationship as shown in Equation 3 below, as assumed above, when the gate current $I_G$ is sufficiently small compared to the anode current $I_A$, a relationship as shown in Equation 4 can be formed.

$$I_{CA} = I_A + I_G \quad \text{[Equation 3]}$$

Here, $I_{CA}$ is a cathode current, $I_A$ is an anode current, and $I_G$ is a gate current.

$$I_{CA} = \frac{Z_{ref}}{V_{ref}} = \approx I_A[\text{if } I_A \gg I_G] \quad \text{[Equation 4]}$$

Here, $I_{CA}$ is a cathode current, $I_A$ is an anode current, $I_G$ is a gate current, $V_{ref}$ is a reference voltage, and $Z_{ref}$ is a proportional constant of the cathode current detector for the cathode current.

Therefore, as assumed above, when the gate current $I_G$ is sufficiently small compared to the anode current $I_A$ so as to be negligible, the gate voltage controller 10 of the electron emission device control apparatus according to an embodiment of the present disclosure can adjust a gate voltage applied to the electron emission device 30 to adjust the anode current $I_A$ to a current corresponding to the reference voltage $V_{ref}$. That is, the gate voltage controller 10 can control the anode current $I_A$ by controlling the reference voltage generator 20 to control the reference voltage $V_{ref}$, and in this case, an amount of X-rays emitted from the electron emission device 30 is determined by the anode current $I_A$, so the gate voltage controller 10 can control the reference voltage generator 20 to adjust the amount of X-rays emitted from the electron emission device 30.

Meanwhile, the gate voltage controller 10 can be configured to include an operational amplifier so as to allow the cathode voltage $V_{CA}$ to be equal to the reference voltage $V_{ref}$. FIG. 4 is an exemplary diagram showing a circuit configuration example of a gate voltage controller including an operational amplifier in an electron emission device control apparatus according to an embodiment of the present disclosure as described above.

Figure 4:
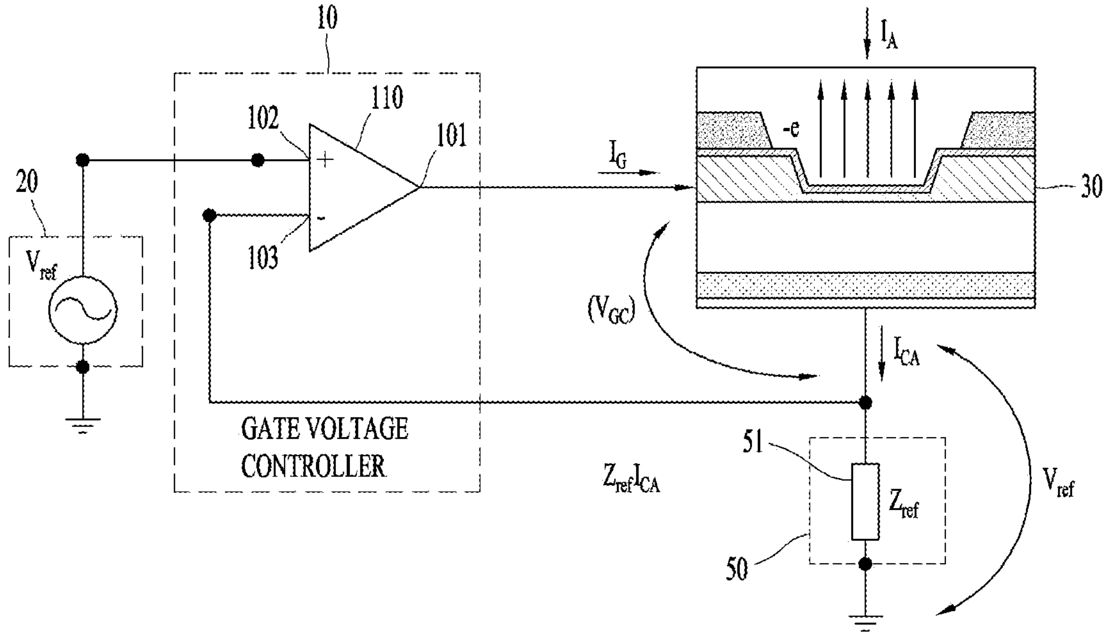
FIG. 4 is an exemplary diagram showing a circuit configuration example of a gate voltage controller that controls a gate voltage in an electron emission device control apparatus according to an embodiment of the present disclosure.

Referring to FIG. 4, the operational amplifier 110 has a first input node 102 that receives a reference voltage, and a second input node 103 that receives a cathode voltage $V_{CA}$, that is, a voltage ($Z_{ref}$*$I_{CA}$) detected by the cathode current detector 50. Additionally, the gate voltage controller 10 can control a voltage of an output terminal 101 such that an input voltage of the first input node 102 is equal to an input voltage of the second input node 103. In this case, a voltage applied to the output terminal 101 can be the gate voltage $V_G$ such that the input voltage of the first input node 102 is equal to the input voltage of the second input node 103. In this case, a difference between the gate voltage $V_G$ and the reference voltage $V_{ref}$ can be the gate-cathode voltage $V_{GC}$. That is, the gate-cathode voltage $V_{GC}$ can be determined according to the cathode voltage $V_{CA}$ and gate voltage $V_G$ detected by the cathode current detector 50.

Meanwhile, the gate voltage controller 10 can be configured as a digital circuit utilizing a micro control unit (MCU). In addition, in the above description, an example in which the cathode current detector 50 uses a shunt resistor has been described, but the cathode current can, of course, be detected through a hole sensor or MI sensor. In this case, the proportional constant $Z_{ref}$ of the cathode current detector 50 can be arbitrarily determined, and when assumed to be 1 ohm, the cathode current $I_{CA}$ and the cathode voltage $V_{CA}$ can have the same value.

Meanwhile, the electron emission device control apparatus according to the embodiment of the present disclosure described above in FIGS. 2 to 4 can determine the gate voltage $V_G$ according to the pre-stored gate-cathode voltage $V_{GC}$ and the preset reference voltage $V_{ref}$ when initially controlling the electron emission device 30, that is, when there is no detected cathode current. Furthermore, when the cathode current is detected from the electron emission device 30 according to the determined gate voltage, the gate voltage $V_G$ that causes the voltage corresponding to the detected cathode current to be equal to the reference voltage $V_{ref}$ can be determined. Furthermore, the gate-cathode voltage $V_{GC}$ can be determined according to a difference between the gate voltage $V_G$ and the reference voltage $V_{ref}$. Therefore, when the initial gate-cathode voltage $V_{GC}$ is a higher voltage than necessary due to the characteristics of the electron emission device 30, it can be changed to the gate-cathode voltage $V_{GC}$ according to the characteristics of the electron emission device 30 in a subsequent process.

Meanwhile, FIGS. 2 to 4 described above assume a case where the gate current is sufficiently small compared to the anode current. However, there can be a case where the gate current does not satisfy the above condition.

As an example, as described above, when the electron emission device 30 uses a gate device such as a MOSFET device, the gate voltage can be sufficiently small compared to the anode voltage due to the characteristics of the MOSFET device that can operate even at a low gate current. However, when the electron emission device 30 does not use a gate device such as a MOSFET device, the gate current can be significantly large and can even have a value larger than the anode current. In this case, it is required to compensate for a voltage due to the gate current. FIGS. 5 to 8 below assume a case where the gate current is not so small as to be negligible compared to the anode current.

Figure 5:
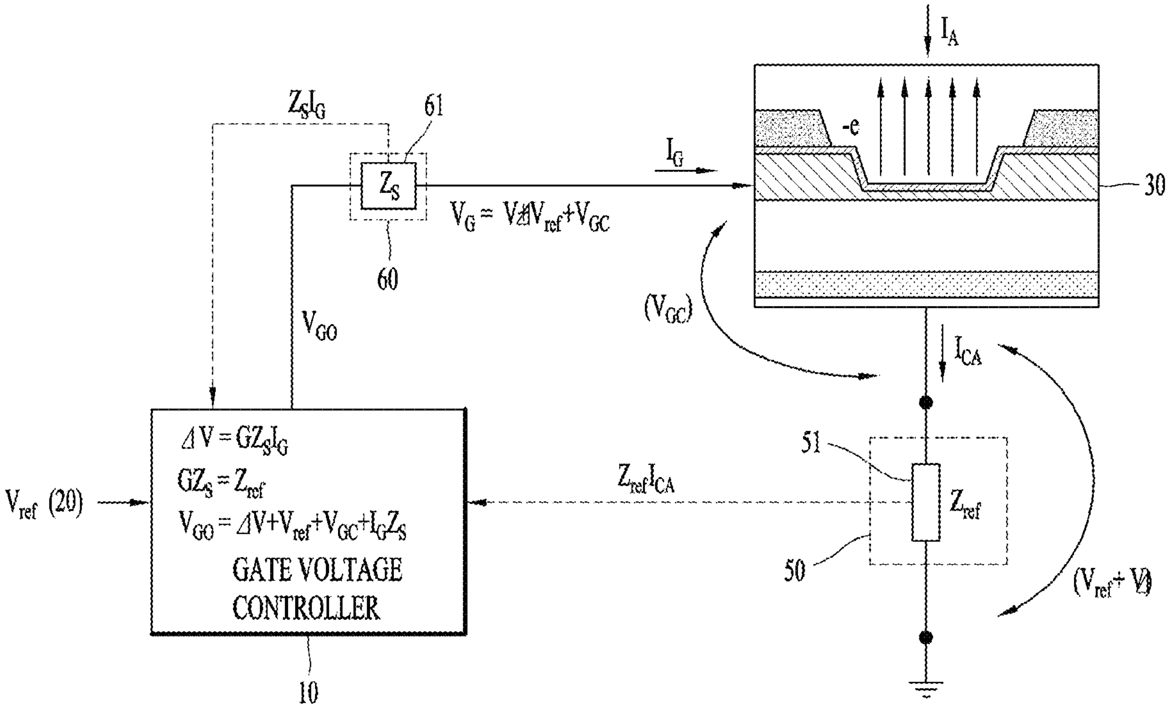
FIG. 5 is a conceptual diagram for explaining a configuration of an electron emission device control apparatus according to an embodiment of the present disclosure, which includes a configuration of compensating for a gate current when the gate current is greater than an anode current.

First, FIG. 5 is a conceptual diagram for explaining a configuration of an electron emission device control apparatus according to an embodiment of the present disclosure, which includes a configuration for compensating for the gate current according to the above-described assumption. Furthermore, FIG. 6 is a flowchart showing an operation process in which the electron emission device control apparatus according to the embodiment of the present disclosure shown in FIG. 5 controls a gate voltage to control an anode current.

Figure 6:
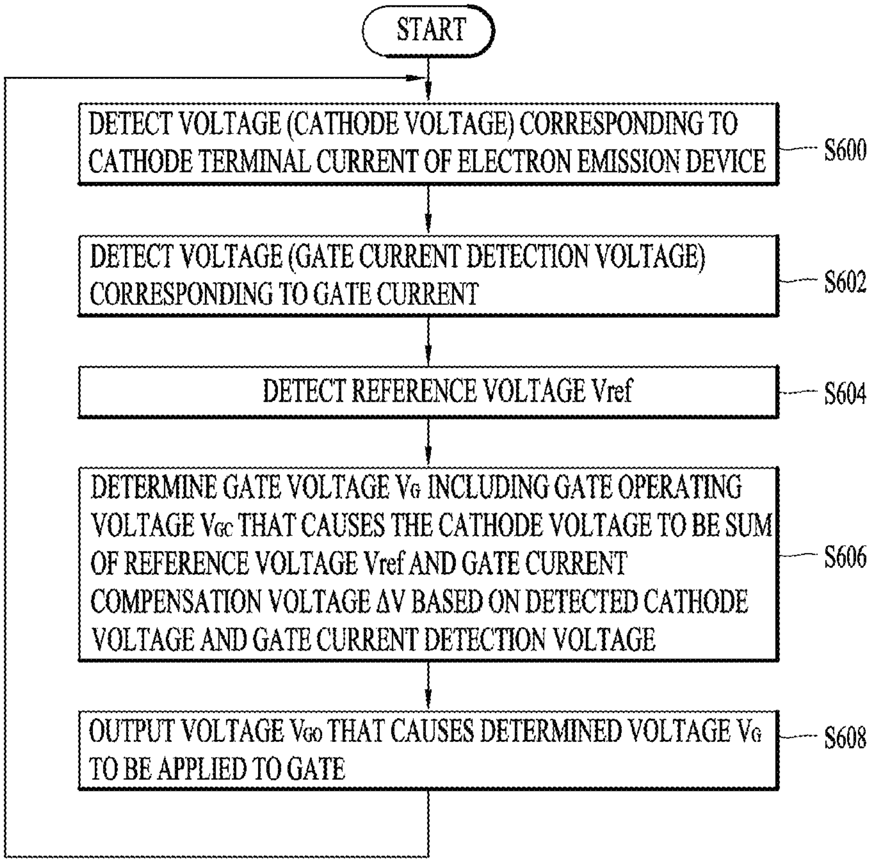
FIG. 6 is a flowchart showing an operation process in which the electron emission device control apparatus according to the embodiment of the present disclosure shown in FIG. 5 controls a gate voltage to control an anode current.

Referring to FIGS. 5 and 6, first, the cathode current detector 50 can detect a current flowing through at least one cathode electrode of the electron emission device 30. Here, in a case where the cathode current detector 50 detects a current using a shunt resistance, the cathode current detector 50 can detect a voltage (cathode voltage $V_{CA}$) corresponding to the cathode current $I_{CA}$ with a value $Z_{ref}*I_{CA}$ obtained by multiplying the detection resistance $Z_{ref}$ of the cathode current detector 50 by the cathode current $I_{CA}$ (S600). Here, since the cathode current detection resistance $Z_{ref}$ has a fixed value, the cathode current detection resistance $Z_{ref}$ can be considered as a proportional constant of the cathode current detector 50 for the cathode current $I_{CA}$.

Meanwhile, when a voltage corresponding to the cathode current is detected through the cathode current detector 50, the gate voltage controller 10 can detect the gate current $I_G$ flowing from the gate electrode of the electron emission device 30 to the cathode electrode through the gate current detector 60 (S602). Here, the gate current $I_G$ can be a current applied to the gate electrode of the electron emission device 30.

Here, in a case where the gate current detector 60 detects a current using a shunt resistor, the gate current detector 60 can detect a voltage corresponding to the gate current $I_G$ with a value $Z_S*I_G$ obtained by multiplying the detection resistance $Z_S$ of the gate current detector 60 by the gate current $I_G$ (S600). Here, since the gate current detection resistance $Z_S$ has a fixed value, the gate current detection resistance $Z_S$ can be considered as a proportional constant of the gate current detector 60 for the gate current $I_G$.

Meanwhile, when a cathode voltage is detected through the cathode current detector 50 and a voltage corresponding to the gate current is detected through the gate current detector 60, the gate voltage controller 10 can detect the reference voltage $V_{ref}$ generated by the reference voltage generator 20 (S604). Furthermore, the gate voltage controller 10 can determine the gate voltage $V_G$ that causes the cathode voltage ($V_{CA}=Z_{ref}*I_{CA}$) detected in the step S600 to be a sum voltage ($V_{ref}+\Delta V$) of the detected reference voltage $V_{ref}$ and the compensation voltage $\Delta V$ due to the gate current $I_G$ (S606).

Here, the compensation voltage $\Delta V$ due to the gate current $I_G$, which is a voltage proportional to the gate current $I_G$ to compensate for the gate current $I_G$, has a value proportional to a detection value of the gate current detector 60 (a voltage value corresponding to the gate current) $Z_S*I_G$ as shown in Equation 5 below.

$$\Delta V = G \cdot Z_S \cdot I_G \qquad \text{[Equation 5]}$$

Here, $\Delta V$ is a compensation voltage according to a gate current, $Z_S$ is a proportional constant of the gate current detector 60, $I_G$ is a gate current, and G is a proportional constant of the compensation voltage $\Delta V$ and a detection value ($Z_S*I_G$) of the gate current detector.

Here, the proportional constant G of the compensation voltage $\Delta V$ and the detection value ($Z_S*I_G$) of the gate current detector 60 is a ratio ($G=Z_{ref}/Z_S$) of a resistance value (proportional constant $Z_{ref}$) of the cathode current detector 50 with respect to a resistance value (proportional constant $Z_S$) of the gate current detector 60, so the compensation voltage $\Delta V$ can be expressed as a product ($Z_{ref}*I_G$) of the resistance value (proportional constant $Z_{ref}$) of the cathode current detector 50 and the gate current $I_G$.

Therefore, the sum voltage ($V_{ref}+\Delta V$) of the reference voltage $V_{ref}$ and the compensation voltage $\Delta V$ can be a voltage obtained by adding the reference voltage $V_{ref}$ to the product ($Z_{ref}*I_G$) of the proportional constant $Z_{ref}$ of the cathode current detector 50 and the gate current $I_G$, that is, $V_{ref}+Z_{ref}*I_G$.

Meanwhile, in the step S606, the gate voltage controller 10 allows the cathode voltage ($V_{CA}=Z_{ref}*I_{CA}$) to be a sum voltage ($V_{ref}+\Delta V$) of the reference voltage $V_{ref}$ and the compensation voltage $\Delta V$, so it can be expressed as Equation 6 below.

$$Z_{ref} \cdot I_{CA} = V_{ref} + Z_{ref} \cdot I_G \quad \therefore I_{CA} = I_G + \frac{V_{ref}}{Z_{ref}} \qquad \text{[Equation 6]}$$

Here, $Z_{ref}$ is a proportional constant of the cathode current detector 50, $I_{CA}$ is a cathode current, $V_{ref}$ is a reference voltage, and $I_G$ is a gate current.

Meanwhile, according to Equation 3, the cathode current $I_{CA}$ is a sum of the gate current $I_G$ and the anode current $I_A$, so the anode current $I_A$ can be determined as $V_{ref}/Z_{ref}$, that is, a magnitude of the reference voltage $V_{ref}$ with respect to a fixed resistance (proportional constant $Z_{ref}$) of the cathode current detector 50 according to Equation 6 and Equation 3.

Therefore, the gate voltage controller 10 of the electron emission device control apparatus according to an embodiment of the present disclosure can adjust a gate voltage applied to the electron emission device 30 to adjust the anode current $I_A$ to a current according to the reference voltage $V_{ref}$. That is, the gate voltage controller 10 can control the anode current $I_A$ by controlling the reference voltage generator 20 to control the reference voltage $V_{ref}$, and in this case, an amount of X-rays emitted from the electron emission device 30 is determined by the anode current $I_A$, so the gate voltage controller 10 can control the reference voltage generator 20 to adjust the amount of X-rays emitted from the electron emission device 30.

Meanwhile, the gate voltage controller 10 can output a voltage such that the gate voltage $V_G$ determined in the step S606 is applied to the gate electrode of the electron emission device 30 (S608). In this case, a voltage $V_{GO}$ output from the gate voltage controller 10 can be determined in consideration of a voltage dropped in the gate current detector 60 for gate current detection. Therefore, in the step S608, the gate voltage controller 10 can output a voltage greater than the gate voltage $V_G$ determined in the step S606 by a voltage dropped in the gate current detection unit 60, that is, a voltage ($Z_S$*$I_G$) corresponding to the gate current.

Meanwhile, the electron emission device control apparatus according to the embodiment of the present disclosure described in FIGS. 5 and 6 can also determine the gate voltage $V_G$ according to the pre-stored gate-cathode voltage $V_{GC}$ and compensation voltage ΔV, the proportional constant $Z_S$ of the gate current detector 60 and the gate current $I_G$, and the preset reference voltage $V_{ref}$ when initially controlling the electron emission device 30, that is, when there is no detected cathode current.

Furthermore, when the cathode current is detected from the electron emission device 30 according to the determined gate voltage, the gate voltage $V_G$ that causes a voltage ($Z_{ref}$*$I_{CA}$) corresponding to the detected cathode current to be equal to a sum voltage ($V_{ref}$+ΔV) of the reference voltage $V_{ref}$ and the compensation voltage ΔV can be determined. Furthermore, the gate-cathode voltage $V_{GC}$ can be determined according to a difference between the gate voltage $V_G$ and the sum voltage ($V_{ref}$+ΔV). Therefore, when the initial gate-cathode voltage $V_{GC}$ is a higher voltage than necessary due to the characteristics of the electron emission device 30, it can be changed to the gate-cathode voltage $V_{GC}$ according to the characteristics of the electron emission device 30 in a subsequent process.

Figure 7:
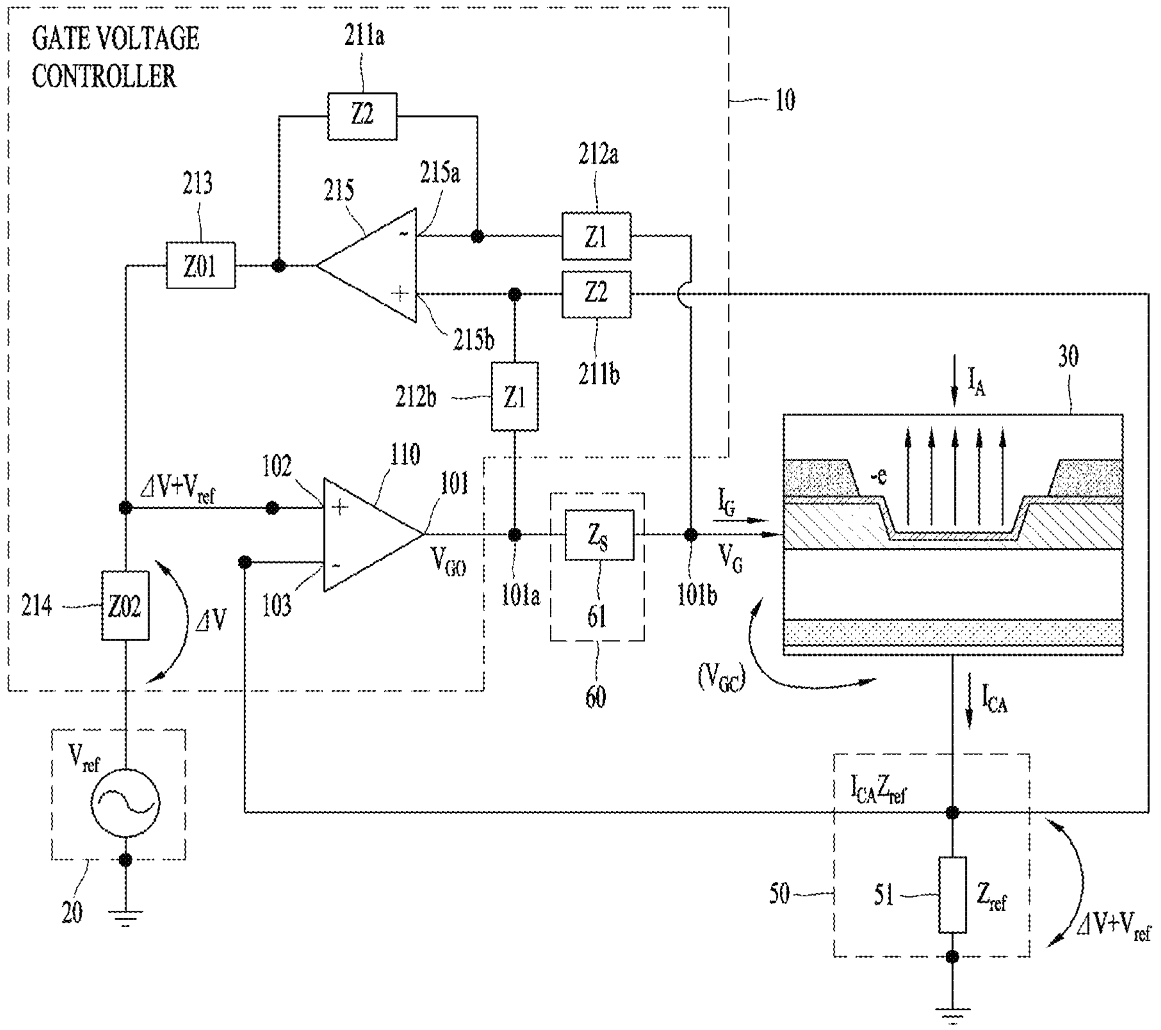
FIG. 7 is an exemplary diagram showing a circuit configuration example of a gate voltage controller that controls a gate voltage in the electron emission device control apparatus shown in FIG. 5.

Meanwhile, FIG. 7 is an exemplary diagram showing a circuit configuration example of the gate voltage controller 10 that controls a gate voltage in the electron emission device control apparatus shown in FIG. 5.

Referring to FIG. 7, the gate voltage controller 10 that generates the gate voltage can include a first input node 102 that receives a reference voltage $V_{ref}$ and a compensation voltage ΔV and a second input node 103 that receives an output voltage ($Z_{ref}$*$I_{CA}$) of the cathode current detector 50, and include a first operational amplifier 110 in which a voltage of the output terminal 101 is controlled such that the voltages input to the first input node 102 and the second input node 103 are equal to each other.

Here, a first resistor 214 having a resistance value Z02 for generating the compensation voltage ΔV can be provided between the reference voltage generator 20 and the first input node 102, which are connected to each other to receive the reference voltage.

Meanwhile, a detection resistor $Z_S$ of the gate current detector 60 for detecting the gate current can be provided between the output terminal 101 of the first operational amplifier 110 and the electron emission device 30. Furthermore, between both ends of the detection resistor $Z_S$, a second node 101*b* connected to the electron emission device 30 can be connected to a first input node 215*a* of a second operational amplifier 215 for gate current compensation, and a second resistor 212*a* having a resistance value Z1 can be provided between the second node 101*b* and the first input node 215*a*.

Meanwhile, between both ends of the detection resistor $Z_S$, a first node 101*a* connected to the output terminal 101 of the first operational amplifier 110 can be connected to a second input node 215*b* of the second operational amplifier 215. Additionally, a third resistor 212*b* having a resistance value Z1 can be provided between the first node 101*a* and the second input node 215*b* of the second operational amplifier 215.

Here, the second input node 215*b* of the second operational amplifier 215 can be connected to the cathode current detector 50 to receive a detection voltage of the cathode current detector 50. In this case, a fourth resistor 211*b* having a resistance value Z2 can be provided between the second input node 215*b* of the second operational amplifier 215 and the cathode current detector 50.

Meanwhile, the first input node 215*a* of the second operational amplifier 215 can be connected to an output terminal of the second operational amplifier 215. In this case, a fifth resistor 211*a* having a Z2 value can be provided between the first input node 215*a* of the second operational amplifier 215 and the output terminal of the second operational amplifier 215. Furthermore, the output terminal of the second operational amplifier 215 can be connected to the first input node 102 of the first operational amplifier 110. In this case, a sixth resistor 213 having a value of Z01 can be provided between the output terminal of the second operational amplifier 215 and the first input node 102 of the first operational amplifier 110.

Here, the first to sixth resistors 214, 212*a*, 212*b*, 211*a*, 211*b*, 213 can be used to adjust the amplification gains of the first operational amplifier 110 and the second operational amplifier 215. Furthermore, a voltage input to the first input node 102 of the first operational amplifier 110 and a voltage applied to the second input node 103 can be equal to each other by the second resistor 212*a* and the third resistor 212*b* having the Z1 value, the fourth resistor 211*a* and the fifth resistor 211*b* having the Z2 value, the first resistor 213 and the sixth resistor 214 having the Z01 value. In this case, the compensation voltage ΔV can have a relationship for the resistance values (Z01, Z1, Z2) as shown in Equation 7 below.

$$\Delta V = G \cdot Z_S \cdot I_G = \frac{Z_{02} \cdot Z_2}{Z_{01} \cdot Z_1} \cdot Z_S \cdot I_G \quad \therefore G = \frac{Z_{02} \cdot Z_2}{Z_{01} \cdot Z_1} \qquad \text{[Equation 7]}$$

Here, when $$\frac{Z_{02} \cdot Z_2}{Z_{01} \cdot Z_1} \cdot Z_S$$

is set to the detection resistance $Z_{ref}$ of the cathode current detector 50, the compensation voltage ΔV becomes $Z_{ref}$*$I_G$, so the cathode voltage $V_{CA}$ can be $V_{ref}$+ΔV.

Figure 8:
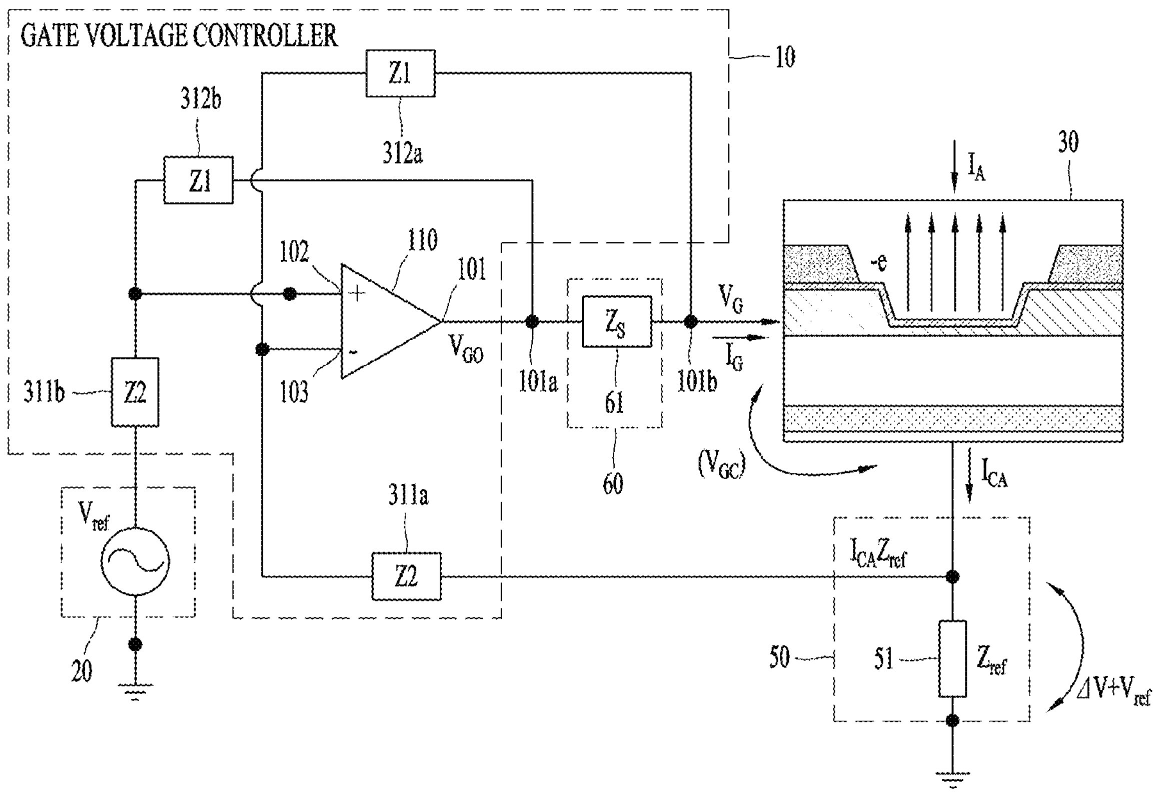
FIG. 8 is an exemplary diagram showing another circuit configuration example of a gate voltage controller that controls a gate voltage in the electron emission device control apparatus shown in FIG. 5.

FIG. 8 is an exemplary diagram showing a different circuit configuration example of the gate voltage controller

10 that controls a gate voltage in the electron emission device control apparatus shown in FIG. 5.

Referring to FIG. 8, the gate voltage controller 10 that generates the gate voltage can include a first input node 102 that receives a reference voltage $V_{ref}$ and a compensation voltage ΔV and a second input node 103 that receives an output voltage ($Z_{ref}*I_{CA}$) of the cathode current detector 50, and include a first operational amplifier 110 in which a voltage of the output terminal 101 is controlled such that the voltages input to the first input node 102 and the second input node 103 are equal to each other.

Here, a first resistor 311*b* having a resistance value Z2 for generating the compensation voltage ΔV can be provided between the reference voltage generator 20 and the first input node 102, which are connected to each other to receive the reference voltage. Furthermore, a second resistor 311*b* having a resistance value Z2 can be provided between the second input node 103 and the cathode current detector 50 connected thereto.

Meanwhile, a detection resistor $Z_S$ of the gate current detector 60 for detecting the gate current can be provided between the output terminal 101 of the first operational amplifier 110 and the electron emission device 30. Furthermore, between both ends of the detection resistor $Z_S$, a second node 101*b* connected to the electron emission device 30 can be connected to the second input node 103, and a third resistor 312*a* having a resistance value Z1 can be provided between the second node 101*b* and the first input node 103.

Meanwhile, between both ends of the detection resistor $Z_S$, a first node 101*a* connected to the output terminal 101 of the first operational amplifier 110 can be connected to the second input node 102. Furthermore, a fourth resistor 312*b* having a resistance value Z1 can be provided between the first node 101*a* and the first input node 102.

In this case, a voltage ($Z_S*I_G$) detected by the gate current detector 60 can be input to the first node 101*a* and the second node 102*b*) at both ends of the detection sensor $Z_S$. Then, a voltage input to the first node 101*a* can be adjusted by the fourth resistor 312*b* having a Z1 value and the first resistor 311*b* having a Z2 value to be input to the first input node 102 of the first operational amplifier 110. Furthermore, a voltage input to the second node 101*b* can be adjusted by the third resistor 312*a* having a Z1 value and the second resistor 311*a* having a Z2 value to be input to the second input node 103 of the first operational amplifier 110. Furthermore, the first operational amplifier 110 can adjust the voltage of the output terminal 101 such that the cathode voltage becomes $V_{ref}+\Delta V$ to output the gate voltage $V_G$. Here, the compensation voltage ΔV can have a relationship for the resistance values Z1, Z2 as shown in Equation 8 below.

$$\Delta V = G \cdot Z_S \cdot I_G = \frac{Z_2}{Z_1} \cdot Z_S \cdot I_G \quad \therefore G = \frac{Z_2}{Z_1} \qquad \text{[Equation 8]}$$

Here, when $$\frac{Z_2}{Z_1} \cdot Z_S$$

is set to the detection resistance $Z_{ref}$ of the cathode current detector 50, the compensation voltage ΔV becomes $Z_{ref}*I_G$, so the cathode voltage $V_{CA}$ can be $V_{ref}+\Delta V$.

Meanwhile, as described above, the gate voltage controller 10 of the electron emission device control apparatus according to an embodiment of the present disclosure detects the cathode voltage and applies a voltage greater than the detected cathode voltage by the gate-cathode voltage as a gate voltage to the electron emission device 30 so as to control the anode current constant. Therefore, when the detected cathode voltage is greater than the gate-cathode voltage $V_{GC}$, there can be a problem in that a voltage greater than the required gate-cathode voltage $V_{GC}$ must be applied to a gate of the electron emission device 30.

The anode current $I_A$ of the electron emission device 30 can be proportional to the gate current $I_G$. In this case, the anode current $I_A$ and the gate current $I_G$ can be shown as Equation 9 below.

$$I_A = \beta \cdot I_G \qquad \text{[Equation 9]}$$

Here, $I_A$ is the anode current, $I_G$ is the gate current, and β is a proportional constant.

In this case, when the electron emission device 30 has characteristics in which the anode current is greater than or equal to the gate current ($I_A \leq I_G$), and the proportional constant β is less than 1, for example, when the anode current $I_A$ is 0.02 A and the proportional constant β is 0.01, the gate current $I_G$ can be calculated as 2 A according to Equation 9.

In this case, the cathode current $I_{CA}$ can be calculated as a sum of the gate current $I_G$ and the anode current $I_A$, so the cathode current $I_{CA}$ can be 2.02 A. Meanwhile, when the resistance value $Z_{ref}$ of the cathode current detector 50 is 20 ohm, the cathode current detection unit 50 can output 40.4 V obtained by multiplying the cathode current $I_{CA}$ of 2.02 A by the resistance value $Z_{ref}$ of 20 ohm as a detection voltage corresponding to the cathode current $I_{CA}$.

Meanwhile, when the gate-cathode voltage $V_{GC}$ is 10 V, the gate-cathode voltage $V_{GC}$ of 10 V is added to the detection voltage of the cathode current detector 50, which is 40.4 V, to set a total gate voltage $V_G$ to 50.4 V, and the set gate voltage $V_G$ can be applied to the gate electrode of the electron emission device 30.

However, as described above, when a gate voltage $V_G$ higher than the gate-cathode voltage $V_{GC}$ is applied, the electron emission device 30 can be turned on to generate electron emission from the cathode electrode. That is, when the gate-cathode voltage $V_{GC}$ having a voltage of above 10 V is applied as the gate voltage, the electron emission device 30 can be turned on, but when a detection value of the cathode current detector 50 is high, the gate voltage can be higher than necessary due to the high detection value of the cathode current detection unit 50. Therefore, the electron emission device 30 can be driven at an unnecessarily high gate voltage, and in this case, a system based on high-voltage protection design, such as high-voltage stress, can be required.

Accordingly, the cathode current detector 50 of the electron emission device control apparatus according to an embodiment of the present disclosure can further include an amplifier capable of amplifying a voltage applied to the detection resistance (proportional constant $Z_{ref}$).

Figure 9:
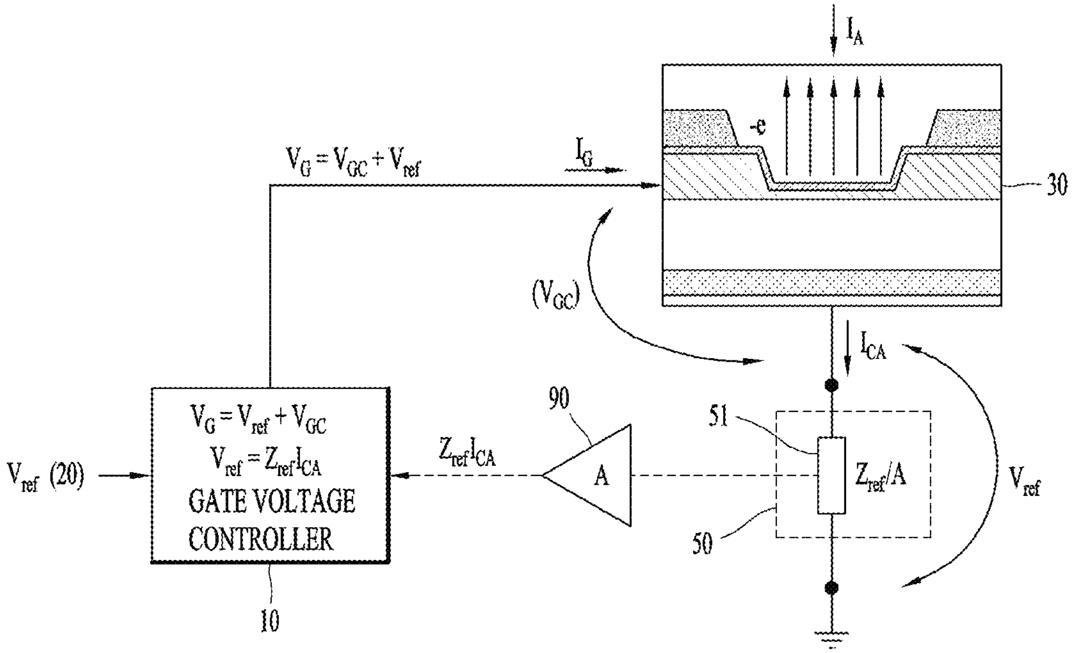
FIG. 9 is a conceptual diagram for explaining a configuration of an electron emission device control apparatus according to an embodiment of the present disclosure, which further includes an amplifier capable of amplifying a cathode current detection voltage.

FIG. 9 is a conceptual diagram for explaining a configuration of an electron emission device control apparatus according to an embodiment of the present disclosure, which further includes an amplifier 90 capable of amplifying a cathode current detection voltage as described above.

In this case, when a voltage applied to the detection resistance $Z_{ref}$ is amplified through the amplifier, the cathode current detector 50 can detect a cathode current according to the amplified voltage applied to the detection resistance $Z_{ref}$.

Therefore, in order to maintain the characteristics of the cathode current $I_{CA}$, a magnitude of the detection resistance $Z_{ref}$, that is, a proportional constant $Z_{ref}$ of the cathode current detector 50 with respect to the cathode current $I_{CA}$, can be reduced. Therefore, a voltage corresponding to the cathode current $I_{CA}$ is detected and output ($Z_{ref}$*$I_{CA}$) according to a product of the reduced proportional constant $Z_{ref}$ and the cathode current $I_{CA}$, and thus the problem of the gate voltage being determined to be higher than necessary can be solved.

For example, as in the foregoing assumption, in a case where the anode current $I_A$ is 0.02 A, the gate current $I_G$ is 2 A (and therefore the cathode current is 2.02 A), and the resistance value $Z_{ref}$ of the cathode current detector 50 is 20 ohm, on the assumption that the amplification gain A of the amplifier 90 is 100, in order to maintain the characteristics of the cathode current $I_{CA}$, the detection resistance of the cathode current detector 50, that is, a magnitude of the proportional constant $Z_{ref}$, can be reduced by 1/100 to 0.2 ($Z_{ref}$=0.2 ohm).

Then, the voltage $V_{CA}$ corresponding to the cathode current $I_{CA}$ detected by the cathode current detector 50 becomes 0.2*2.02=0.404 V, and in this case, when the gate-cathode voltage $V_{GC}$ is 10 V, the gate voltage controller 10 can determine the gate voltage $V_G$ to be 10+0.404, that is, 10.404 V. That is, it can be seen that the gate voltage of the electron emission device 30 can be determined at a voltage close to the gate-cathode voltage $V_{GC}$, which is a turn-on voltage.

In this case, in consideration of an efficiency of the electron emission device 30, that is, a power consumption between the gate and the ground, the power consumption (W) between the gate and the ground can be calculated as a sum of a gate power consumption and a power consumption of the cathode current detector 50.

Here, the gate power consumption can be calculated according to the gate-cathode voltage $V_{CG}$ and the gate current $I_G$, so in the case of the foregoing assumption, the gate power consumption is 10*2=20 W, and therefore, a case in which the amplifier 90 is employed can be the same as that in which the amplifier 90 is not employed.

However, when comparing the power consumption of the cathode current detector 50, first, in the case in which the amplifier 90 is not employed, the power consumption of the cathode current detector 50 is calculated as a square of the current (cathode current $I_{CA}$) and the resistance value $Z_{ref}$, $(2.02\ A)^2$*20 ohm, that is, 81.6 W, and thus can be calculated as 101.6 W in consideration of the gate power consumption. On the contrary, when the amplifier 90 is employed, the power consumption of the cathode current detector 50 is calculated as a square of the current (cathode current $I_{CA}$) and the resistance value $Z_{ref}$, (2.02 A) 2*0.02 ohm, that is, 0.08 W, and thus can be calculated as 20.8 W in consideration of the gate power consumption. That is, it can be seen that the efficiency of the electron emission device 30 can be greatly improved when the amplifier 90 is employed.

Figure 10:
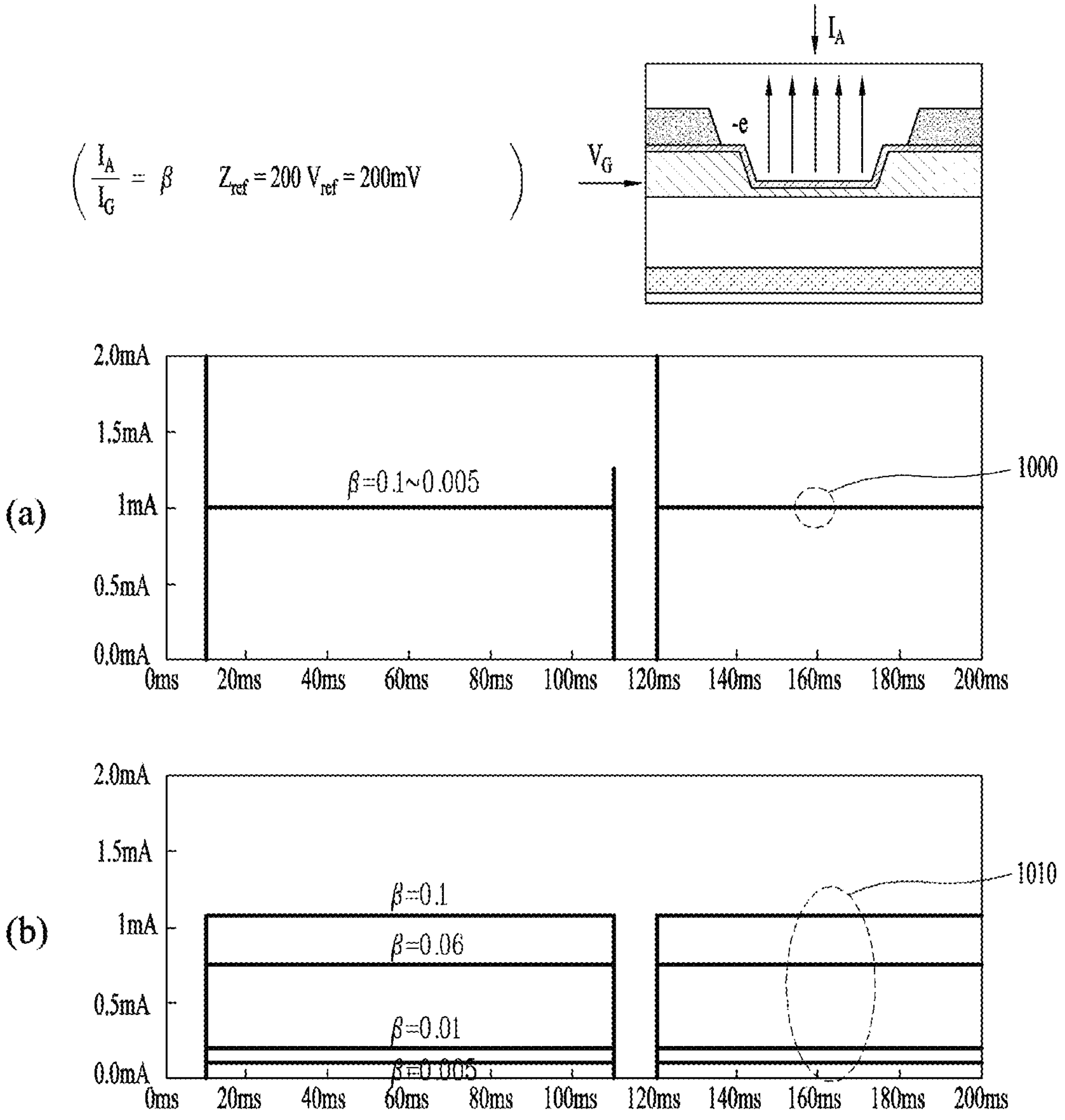
FIG. 10 is an exemplary diagram showing an example of an anode current controlled in an electron emission device control apparatus according to an embodiment of the present disclosure, and an anode current controlled in a typical electron emission device control apparatus.

Meanwhile, FIG. 10 shows examples of an anode current controlled by the electron emission device control apparatus, wherein (a) of FIG. 10 shows an example of the anode current controlled in the electron emission device control apparatus according to an embodiment of the present disclosure, and (b) of FIG. 10 shows an example of the anode current controlled in a typical electron emission device control apparatus. In (a) and (b) of FIG. 10, it is assumed that a detection resistance of the cathode current detector 50, that is, a detection voltage proportional constant $Z_{ref}$ of the cathode current detector 50 for a cathode current is 200 mohm, and a reference voltage $V_{ref}$ is 200 mV.

First, referring to (a) of FIG. 10, in the case of the electron emission device control apparatus to which the present disclosure is applied, as shown in Equation 6 above, $$I_{CA} = I_G + \frac{V_{ref}}{Z_{ref}},$$

and therefore, the anode current can be fixed according to a ratio of the reference voltage $V_{ref}$ to the detection voltage proportional constant $Z_{ref}$ of the cathode current detector 50. That is, a magnitude of the anode current $I_A$ can be fixed by $V_{ref}/Z_{ref}$ regardless of the electron emission device characteristic (β) of the gate current $I_G$ with respect to the anode current $I_A$. Therefore, as shown in (a) of FIG. 10, even when the electron emission device characteristic (B) varies from 0.005 to 0.1, the magnitude of the anode current $I_A$ can be fixed (1000), and accordingly, the amount of X-rays generated can be constant regardless of the electron emission device characteristic (β).

However, when the present disclosure is not applied, the anode current $I_A$ and the gate current $I_G$ have a relationship as shown in Equation 9. Therefore, as shown in (b) of FIG. 10, for the same gate current $I_G$, the anode current $I_A$ can vary depending on the characteristic (B) of the electron emission device. That is, as in the foregoing example, when the electron emission device characteristic (B) varies from 0.005 to 0.1, the anode current $I_A$ can vary (1010). Therefore, a problem can arise that the amount of X-rays generated varies depending on the characteristics (β) of the electron emission device.

The foregoing control method of the present disclosure can be implemented as computer-readable codes on a program-recorded medium. The computer-readable medium can include any type of recording device in which data readable by a computer system is stored. Examples of the computer-readable media can include a hard disk drive (HDD), a solid-state disk (SSD), a silicon disk drive (SDD), a ROM, a RAM, a CD-ROM, a magnetic tape, a floppy disk, and an optical data storage device, and the like, and also include a device implemented in the form of a carrier wave (for example, transmission via the Internet). The above detailed description is therefore to be construed in all aspects as illustrative and not restrictive. The scope of the present disclosure should be determined by reasonable interpretation of the appended claims and all changes that come within the equivalent scope of the present disclosure are included in the scope of the present disclosure.

The invention claimed is:

1. A control apparatus of an electron emission device, the control apparatus comprising:

the electron emission device comprising at least one cathode electrode, an anode electrode paired with the cathode electrode, and at least one gate electrode for controlling a current flowing through the anode electrode;

a cathode current detector that detects a current flowing through the cathode electrode of the electron emission device;

a reference voltage generator that generates a reference voltage; and a gate voltage controller that receives the reference voltage and the detection voltage of the cathode current detector, determines a gate voltage for controlling the electron emission device such that the detection voltage of the cathode current detector is equal to the reference voltage, and applies the determined gate voltage to the gate electrode of the electron emission device.

2. The control apparatus of claim 1, wherein the gate voltage controller determines a voltage greater than the reference voltage by a gate-cathode voltage formed between the gate electrode and the cathode electrode as the gate voltage, and wherein the gate-cathode voltage is a voltage threshold required for electron emission from the cathode electrode.

3. The control apparatus of claim 1, wherein the current flowing through the anode electrode is a current corresponding to the reference voltage when the current flowing through the anode electrode and the current flowing through the gate electrode satisfy a preset condition.

4. The control apparatus of claim 1, further comprising:

a gate current detector for detecting a gate current flowing through the gate electrode in the electron emission device, wherein the gate voltage controller determines a gate voltage for controlling the electron emission device such that the detection voltage of the cathode current detector is equal to a sum of the reference voltage and a compensation voltage for the gate current, and wherein the compensation voltage is determined according to a detection resistance $Z_{ref}$ of the cathode current detector for the current flowing through the cathode electrode and a magnitude of the gate current.

5. The control apparatus of claim 4, wherein a gate voltage that causes the detection voltage of the cathode current detector to be equal to the sum of the reference voltage and the compensation voltage is determined as a voltage greater than the detection voltage by a voltage that is a sum of the compensation voltage, a gate-cathode voltage formed between the gate electrode and the cathode electrode, and the detection voltage of the gate current detector.

6. The control apparatus of claim 5, wherein the current flowing through the anode electrode is determined according to a magnitude of the reference voltage with respect to the detection resistance $Z_{ref}$ of the cathode current detector.

7. The control apparatus of claim 4, wherein the cathode current detector and the gate current detector is each any one of a hole sensor, a magneto impedance (MI) current sensor, and a current sensor that detects a voltage dropped by a shunt resistance as a current.

8. The control apparatus of claim 1, wherein the cathode current detector further comprises an amplifier for amplifying a voltage applied to a detection resistance of the cathode current detector, and wherein the gate voltage controller determines the gate voltage based on a detection voltage of the cathode current detector, which is detected based on a detection resistance relatively lowered by an amplification gain of the amplifier.

9. A control method of a control apparatus for controlling an electron emission device that generates X-rays through electrons emitted through at least one cathode electrode, the control method comprising:

detecting a cathode voltage corresponding to a current flowing through the cathode electrode;

detecting a reference voltage; determining a gate voltage such that the cathode current detection voltage is equal to the reference voltage based on a gate-cathode voltage, which is a voltage between a gate electrode of the electron emission device and the cathode electrode, and the reference voltage; and applying the determined gate voltage to the electron emission device to control the electron emission device such that a current corresponding to the reference voltage flows through the cathode electrode as the gate-cathode voltage drops through the electron emission.

10. The control method of claim 9, wherein the gate-cathode voltage is a voltage threshold required for electron emission from the cathode electrode.

11. The control method of claim 9, wherein a current flowing through an anode electrode of the electron emission device is a current corresponding to the reference voltage when the current flowing through the anode electrode and a current flowing through the gate electrode satisfy a preset condition.

12. The control method of claim 9, wherein the detecting of the reference voltage further comprises detecting a gate current flowing through the gate electrode, wherein the determining of the gate voltage comprises determining a gate voltage for controlling the electron emission device such that the cathode voltage is equal to a sum of a compensation voltage for the gate current and the reference voltage, and wherein the compensation voltage is determined according to a magnitude of the gate current and a detection resistance $Z_{ref}$ for detecting the cathode voltage from the cathode current.

13. The control method of claim 12, wherein a gate voltage that causes the cathode voltage to be equal to the sum of the reference voltage and the compensation voltage is determined as a voltage greater than the detection voltage by a voltage that is a sum of the compensation voltage, the gate-cathode voltage, and a detection voltage corresponding to the gate current.

14. The control method of claim 12, wherein a current flowing through an anode electrode of the electron emission device is determined according to a magnitude of the reference voltage with respect to the detection resistance $Z_{ref}$ for detecting a current flowing through the cathode electrode as the cathode voltage.

15. The control method of claim 9, wherein the detecting of the cathode voltage further comprises amplifying a voltage applied to a detection resistance $Z_{ref}$ for detecting a current flowing through the cathode electrode as the cathode voltage, and wherein the determining of the gate voltage comprises determining the gate voltage based on the cathode voltage detected based on the detection resistance relatively lowered by an amplification gain.

* * * * *